Oct. 24, 1933.   W. A. ANDERSON   1,932,201
LAWN MOWER
Filed Nov. 23, 1931
FIG. I.
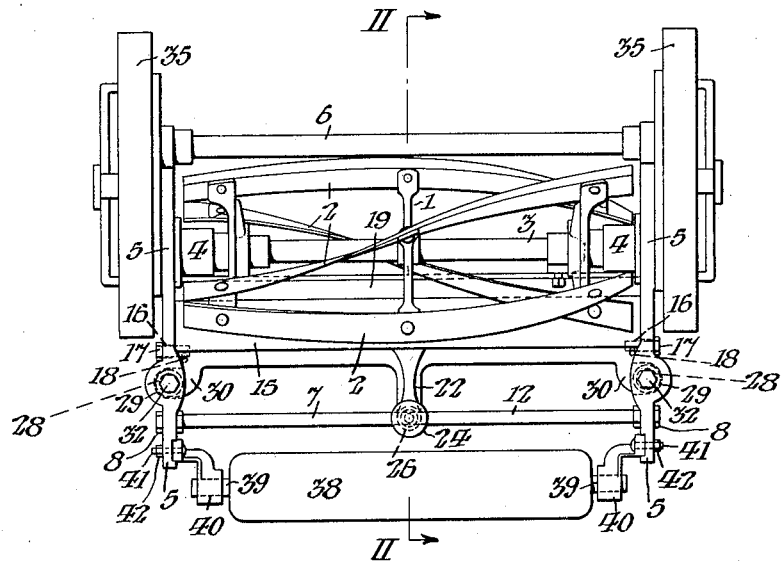
FIG. II.
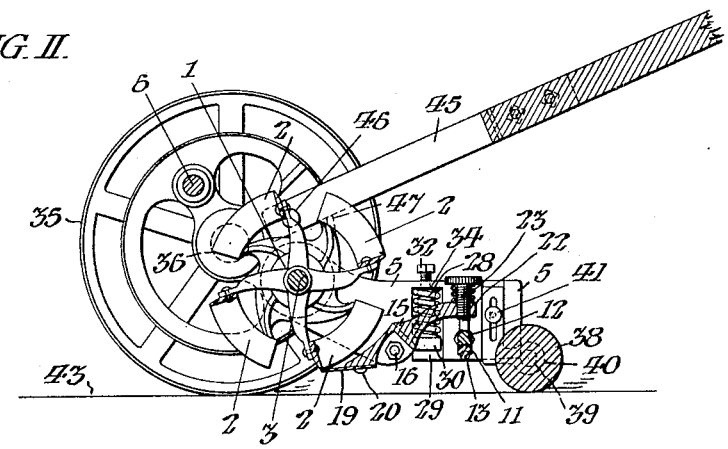
FIG. III.
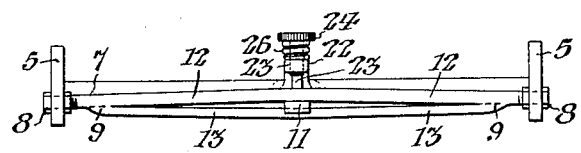
INVENTOR:
WILLIAM A. ANDERSON,
BY Arthur E. Paige,
Attorney.

Patented Oct. 24, 1933

1,932,201

UNITED STATES PATENT OFFICE 1,932,201

LAWN MOWER

William A. Anderson, Hightstown, N. J.

Application November 23, 1931
Serial No. 576,826

6 Claims. (Cl. 56—294)

This invention relates to mowers of the general class claimed in Letters Patent of the United States 1,802,304 granted to me April 21, 1931, wherein a rotary cutter, comprising a circular series of spirally extending blades, is mounted to rotate in cooperative relation with a single blade which is pivoted in bearings in the mower frame and adjustable toward and away from said cutter to attain the maximum cutting efficiency thereof. In the patented structure, the means for effecting adjustment of the single pivoted blade includes a screw bolt which extends loosely through the blade but in screw threaded engagement with a cross bar in the mower, and a single spring encircling said bolt. That spring continually stresses the forward edge of said single blade toward the cutter, and a stop nut on said bolt limits the movement of the blade by said spring. I found that wear of its pivots and bearings permits that blade to chatter. My present invention omits that bolt, provides stop means carried by the blade, and prevents such chattering of the pivoted blade by continually holding it with its pivots stressed toward the bottom of their bearings. In the form of my invention shown, I have not only substituted two springs for the single spring shown in said patent, but have mounted them in such spaced relation with the means for limiting the throw thereof as to distribute the stresses upon the pivoted blade in such manner as to attain the maximum degree of stability thereof in any position of adjustment. During practical use of my patented mower, it appeared that the cross bar with reference to which adjustment of the pivoted blade was effected was so far resilient, that yielding movement thereof, under stresses to which it was subjected, permitted the blade to move from its desired position of adjustment and thus impaired the efficiency of the mower. Therefore, an adjunctive feature of my present invention is the provision of a cross member of a peculiar truss form affording the maximum degree of rigidity with the minimum amount of metal.

My invention includes the various novel features of construction and arrangement hereinafter more definitely specified.

In said drawing; Fig. I is a plan view of a lawn mower embodying my invention.

Fig. II is a vertical sectional view of said mower taken on the line II, II, in Fig. I.

Fig. III is a fragmentary elevation of the rear portion of said mower showing said truss form of the cross member of the frame with respect to which adjustment of the blade is effected.

In said figures; the rotary cutter 1 comprises the circular series of spiral blades 2 and the shaft 3 mounted to rotate in bearings 4 in the mower frame comprising the opposite side plates 5 which are rigidly connected by the front cross bar 6 and rear cross member 7.

As shown in Figs. II and III; said cross member 7 is screw threaded at each of its ends which extend through the respective frame plates 5 and are provided with nuts 8 upon opposite sides of said plates. Said member 7 comprises two wrought metal members which are welded together at 9, 9 in parallel relation, and thereafter separated by the block 11 intermediate of their length, so that the upper bar member 12 which is of larger cross section than the lower rod 13, is bowed under compression lengthwise by the lower rod member 13 which is under tension lengthwise (like a bow string) with the effect of preventing any deflection of said member 7 under the stresses to which it is thereafter subjected during the operation of the mower.

The straight blade member 15 is conveniently formed of cast metal and has opposite end pivots 16, conveniently formed of cap screws (which have heads 17 outside of the respective frame plates 5, as shown in Fig. I), which are rigidly but detachably in screw threaded engagement therewith but have smooth portions adjoining their heads journaled in bearings in said frame plates 5. Said pivots are prevented from accidental displacement by respective set screws 18. Said blade member 15 carries at its forward edge the cutting edge plate 19, conveniently formed of sheet steel, rigidly but detachably connected with the cast metal plate member of the blade 15 by the screws 20. Said blade member 15 has, intermediate of its length, the stop bracket 22 carrying the stop screw 23 conveniently provided with the milled head 24 by which it may be turned, to adjust it through said bracket 22 toward and away from said cross member 7. Said stop screw 23 may be provided with any suitable means for preventing its accidental displacement from any position of adjustment, for instance, I have shown the spring 26 encircling said screw 23 beneath its head 24 and bearing upon the outer surface of said bracket. However, said head 24 is corrugated and may be held in adjusted position by a flat spring such as shown in my Letters Patent aforesaid.

Said blade pivots 16 are continually stressed downward in their bearings in said frame plates 5 by the two springs 28, respectively at opposite sides of the mower and mounted in housings 29 formed in said frame plates 5. Said springs bear upon respective lugs 30 projecting rearwardly from the blade member 15, as shown in Figs. I and II, and encircle upwardly extending projections on said lugs, which prevent accidental displacement of the lower ends of said springs. Said lugs 30 which project into said housings 29 as shown in dotted lines in Fig. I and in full lines in Fig. II are, of course, free to move up and down in said housings under pressure of said springs 28 as said blade 15 which carries said lugs turns upon its pivots 16 shown in Fig. II. The stress of said springs 28 may be varied by axial adjustment of the respective set screws 32 which are in screw threaded engagement with the tops of said housings 29 in said frame plates 5 and bear upon caps 34 with which the upper ends of said springs 28 are provided.

The construction and arrangement above described are such that the forward edge of said blade member 15, which cooperates with said rotary cutter blades 2, is also free to swing away from said cutter, to prevent jamming of the latter by anything caught between said blades of such a character as not to be cut by their cooperative effect, and to permit such obstructions to be readily withdrawn by the operator.

Said mower frame is conveniently provided with two supporting wheels 35 mounted for independent rotation on stationary studs 36 projecting outwardly from said frame plates 5; and by the roller 38 which has the shaft 39 loosely journaled in brackets 40 which are held in vertically adjustable position on said frame plates by bolts 41 and nuts 42; whereby the height of said rotary cutter blades 2 from the ground line 43 may be variably determined. Said mower may be caused to traverse the ground by any convenient means, for instance, by a handle having members 45 at opposite sides thereof respectively engaging pivot studs 46 on said frame plates 5 and adapted to bear against lugs 47 on said plates.

However, I do not desire to limit myself to the precise details of construction and arrangement herein set forth, as it is obvious that various modifications may be made therein without departing from the essential features of my invention, as defined in the appended claims:

I claim:

1. In a lawn mower, the combination with a frame; of a rotary cutter having its opposite ends journaled in said frame; a blade pivoted at its opposite ends in bearings in said frame and having a cutting edge adapted for cooperation with said rotary cutter; springs, respectively at opposite sides of said frame and rearward of the pivoted ends of said blade, for stressing the cutting edge of said blade toward the rotary cutter and stressing the pivots of said blade toward the bottom of their bearings; and means, including a cross member in said frame and an adjustable screw carried by said blade rearward of its pivoted ends, and overhanging said cross member, for limiting the movement of said blade under stress of said springs; whereby the cutting edge of said blade is free to yield away from said cutter, against the stress of said springs, but said springs prevent chattering of said blade in its bearings.

2. In a lawn mower, the combination with a frame; of a rotary cutter having its opposite ends journaled in said frame; an adjustable blade pivoted at its opposite ends in bearings in said frame and having a cutting edge adapted for cooperation with said rotary cutter; a spring for stressing the cutting edge of said blade toward the rotary cutter and stressing the pivots of said blade toward the bottom of their bearings; and means for limiting the movement of said blade under stress of said spring, including a cross member in said frame; whereby the cutting edge of said blade is free to yield away from said cutter, against the stress of said spring.

3. In a lawn mower, the combination with a frame, comprising opposite side plates of cast metal; of a rotary cutter and a blade in cooperative relation, both journaled in said plates; and a cross bar, independent of said blade, rigidly connecting said plates and including two members respectively compressively and tensilely stressed longitudinally with respect to said bar and parallel with said cutter and blade, in cooperative trussed relation.

4. In a lawn mower, the combination with a frame, comprising opposite cast metal plates; of a rotary cutter and a blade in cooperative relation, both journaled in said plates; and a cross member of wrought metal, independent of said cutter and blade, rigidly connecting said plates, including two members permanently connected with each other at their ends and in spaced relation with each other intermediate of their length, one of said members being permanently compressively stressed and the other permanently tensilely stressed, and one of said members having unitary screw threaded ends extending in said plates, for rigidly connecting them.

5. A frame member for a lawn mower, including a bar and a rod, in inflexibly rigid relation, the ends of said bar being united to said rod; and a block immovably wedged between said bar and rod intermediate of their length; for permanently compressively stressing said bar and tensilely stressing said rod in cooperatively trussed relation.

6. A lawn mower as in claim 1; wherein the cross member is a truss including two members permanently respectively compressively and tensilely stressed in cooperative relation, longitudinally with respect to said member and parallel with said blade, for preventing said member from yielding under pressure transmitted thereto from said screw.

WILLIAM A. ANDERSON.